(12) United States Patent
Parvin et al.

(10) Patent No.: US 10,835,851 B2
(45) Date of Patent: Nov. 17, 2020

(54) FILTER DEVICES METHODS AND SYSTEM

(71) Applicant: Oy Halton Group Ltd., Helsinki (FI)

(72) Inventors: Fuoad A. Parvin, Hermitage, TN (US); Bernard A. Olson, Arden Hills, MN (US); Andrey V. Livchak, Bowling Green, KY (US)

(73) Assignee: Oy Halton Group Ltd., Helsinki (FI)

( * ) Notice: Subject to any disclaimer, the term of this patent is extended or adjusted under 35 U.S.C. 154(b) by 170 days.

(21) Appl. No.: 15/766,346

(22) PCT Filed: Oct. 9, 2016

(86) PCT No.: PCT/US2016/056204
§ 371 (c)(1),
(2) Date: Apr. 5, 2018

(87) PCT Pub. No.: WO2017/062926
PCT Pub. Date: Apr. 13, 2017

(65) Prior Publication Data
US 2019/0118129 A1    Apr. 25, 2019

Related U.S. Application Data

(60) Provisional application No. 62/239,844, filed on Oct. 9, 2015.

(51) Int. Cl.
*B01D 46/02* (2006.01)
*B01D 46/00* (2006.01)
*B01D 39/14* (2006.01)

(52) U.S. Cl.
CPC .......... *B01D 46/023* (2013.01); *B01D 39/14* (2013.01); *B01D 46/0002* (2013.01); *B01D 46/0024* (2013.01); *B01D 46/026* (2013.01)

(58) Field of Classification Search
CPC .. B01D 46/00; B01D 46/023; B01D 46/0002; B01D 46/0024; B01D 46/026; B01D 39/14
(Continued)

(56) References Cited

U.S. PATENT DOCUMENTS 3,364,664 A    1/1968 Doane
3,376,804 A    4/1968 Marks
(Continued)

FOREIGN PATENT DOCUMENTS

CN    102665855 A    9/2012
CO    7240412 A2    4/2015
(Continued)

OTHER PUBLICATIONS

Extended European Search Report dated Apr. 25, 2019 for European Patent Application No. 16854526.7.
(Continued)

*Primary Examiner* — T. Bennett McKenzie
(74) *Attorney, Agent, or Firm* — Potomac Law Group, PLLC; George Dolina

(57) ABSTRACT

A pocket filter adapted for filtering grease and other liquid aerosols has first and second depth loading media with a separator that prevents wicking thereby to extend filter life and capacity. The first layer is also of lower efficiency than the second to distribute loading and further extend life. The spacer may be of unwoven fiber mesh. Various feature of the pocket filter ensure free flow of effluent streams.

16 Claims, 10 Drawing Sheets

(58) Field of Classification Search
USPC .................................. 55/361–382, DIG. 12
See application file for complete search history.

(56) References Cited

U.S. PATENT DOCUMENTS

| | | | |
|---|---|---|---|
| 3,494,113 A | 2/1970 | Kinney | |
| 3,566,585 A | 3/1971 | Voloshen et al. | |
| 3,606,740 A | 9/1971 | Ballennie | |
| 3,813,856 A | 6/1974 | Jensen | |
| 3,834,135 A | 9/1974 | Jordan | |
| 3,870,494 A | 3/1975 | Doane | |
| 3,910,782 A | 10/1975 | Struble et al. | |
| 3,945,812 A | 3/1976 | Doane | |
| 3,953,566 A | 4/1976 | Gore | |
| 3,955,949 A | 5/1976 | Rohrer | |
| 3,962,153 A | 6/1976 | Gore | |
| 4,096,227 A | 6/1978 | Gore | |
| 4,187,390 A | 2/1980 | Gore | |
| 4,189,990 A | 2/1980 | Kittler | |
| 4,319,898 A | 3/1982 | Maierhofer | |
| 4,690,701 A | 9/1987 | Hedrick et al. | |
| 5,302,174 A | 4/1994 | Guetersloh | |
| 5,320,656 A | 6/1994 | Hammer | |
| 5,342,422 A | 8/1994 | Wimbock | |
| 5,667,544 A | 9/1997 | Haas et al. | |
| 5,755,962 A | 5/1998 | Gershenson et al. | |
| 5,800,585 A * | 9/1998 | Choi .................... | B01D 46/002 55/483 |
| 5,914,453 A | 6/1999 | James et al. | |
| 6,293,983 B1 | 9/2001 | More | |
| 6,394,083 B1 | 5/2002 | Lambertson | |
| 6,454,825 B1 | 9/2002 | Cheimets et al. | |
| 6,656,244 B1 | 12/2003 | Galassi | |
| 6,840,975 B2 | 1/2005 | Bohacik | |
| 7,018,449 B2 | 3/2006 | Fitch et al. | |
| 7,465,332 B2 | 12/2008 | Randinelli | |
| 7,571,721 B2 | 8/2009 | Aviles | |
| 7,588,617 B2 | 9/2009 | Kyllönen et al. | |
| 7,785,382 B2 | 8/2010 | Morton | |
| 7,947,123 B2 | 5/2011 | Kwok et al. | |
| 8,652,241 B2 | 2/2014 | Alexander et al. | |
| 8,673,040 B2 | 3/2014 | Handley et al. | |
| 2002/0192449 A1 | 12/2002 | Hobbs et al. | |
| 2006/0157048 A1 | 7/2006 | Heilman | |
| 2007/0175817 A1 | 8/2007 | Goldman | |
| 2008/0034776 A1 | 2/2008 | Jensen | |
| 2008/0202083 A1 | 8/2008 | Graham et al. | |
| 2008/0216654 A1 | 9/2008 | Wagner et al. | |
| 2008/0283476 A1 | 11/2008 | Dralle | |
| 2009/0031682 A1* | 2/2009 | Langlands ......... | B01D 46/0005 55/378 |
| 2009/0044702 A1 | 2/2009 | Adamek et al. | |
| 2009/0249957 A1 | 10/2009 | Lackey | |
| 2009/0288655 A1 | 11/2009 | Tsai | |
| 2010/0294132 A1* | 11/2010 | Ishida ..................... | B60H 3/06 96/11 |
| 2012/0079942 A1* | 4/2012 | Hiner ................. | B01D 39/1623 95/286 |
| 2012/0192534 A1 | 8/2012 | Lambertson | |
| 2012/0213926 A1* | 8/2012 | Lauer .................... | B01D 29/111 427/244 |
| 2012/0247074 A1 | 10/2012 | Chmayssani et al. | |
| 2012/0255375 A1 | 10/2012 | Kwok et al. | |
| 2013/0313168 A1 | 11/2013 | Wojciechowski | |
| 2013/0340621 A1 | 12/2013 | Tanis et al. | |
| 2014/0332012 A1 | 11/2014 | Mekler et al. | |
| 2014/0366496 A1 | 12/2014 | Salpietra | |
| 2015/0128540 A1 | 5/2015 | Eyers et al. | |

FOREIGN PATENT DOCUMENTS

| | | |
|---|---|---|
| JP | 05037308 U | 5/1993 |
| JP | 08089729 A | 4/1996 |
| JP | 08117527 A | 5/1996 |
| JP | 2009226243 A | 10/2009 |
| WO | 2013003769 A2 | 1/2013 |
| WO | 2014143039 A1 | 9/2014 |

OTHER PUBLICATIONS

International Preliminary Report on Patentability for International Application No. PCT/US2016/056204 dated Apr. 19, 2018.

Buonanno et al., "Particle emission factors during cooking activities", Atmospheric Environment, vol. 43(20), Jun. 1, 2009, pp. 3235-3242.

International Search Report and Written Opinion for Application No. PCT/US2016/056204 dated Mar. 24, 2017.

Letts et al., "Selecting fiber materials to improve mist filters", Journal of Aerosol Science, vol. 34(11), available online Jun. 21, 2003, pp. 1481-1492.

Mead-Hunter et al., "The influence of soot nanoparticles on the micro/macro-scale behaviour of coalescing filters", Chemical Engineering Science, vol. 84, available online Aug. 24, 2012, pp. 113-119.

Shevchenko, "Problem of Grease and its Solutions in Commercial Kitchens", Bachelor's Thesis for Degree Program in Building Services Engineering at Mikkelin University of Applied Sciences dated Mar. 25, 2012 (40 pp.).

Japanese Notice of Reasons for Refusal dated Sep. 8, 2020, issued in Japanese Application No. 2018-517860.

Office Action (First) dated Jun. 12, 2020 for Chinese Patent Application No. 201680058348.3.

* cited by examiner

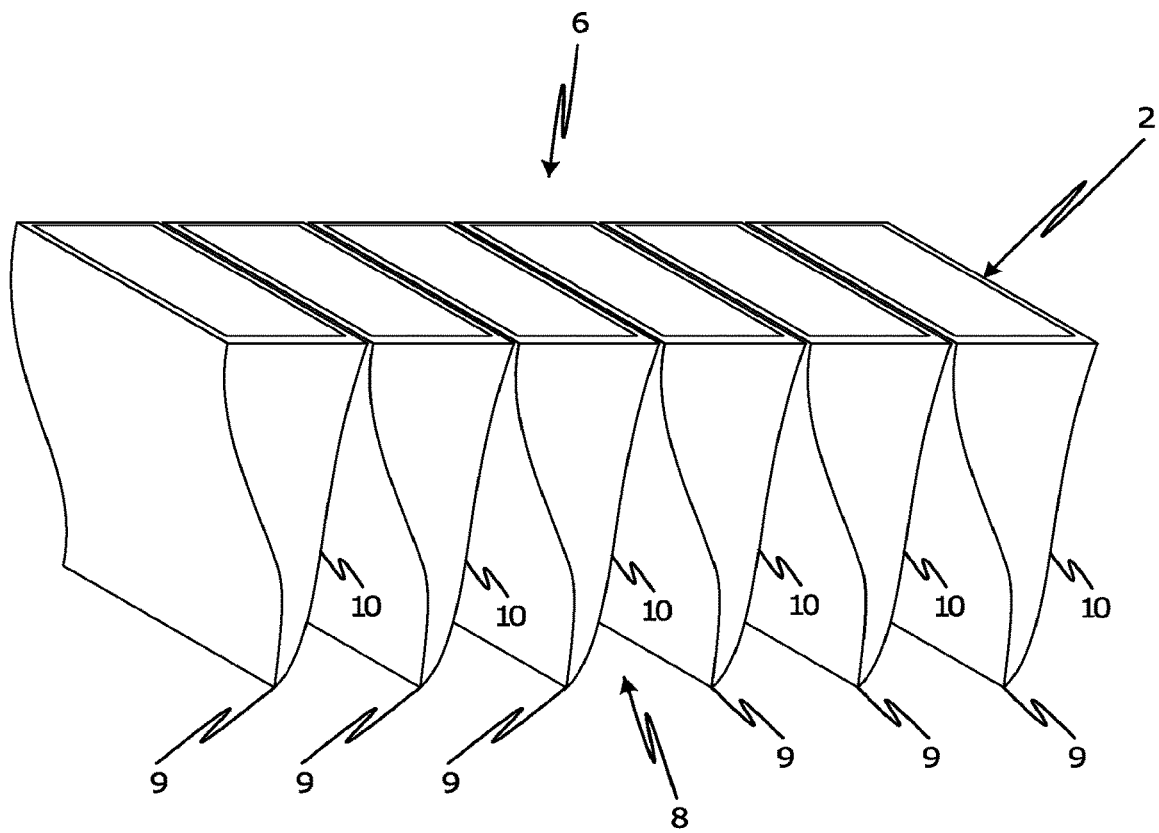
Fig. 1A
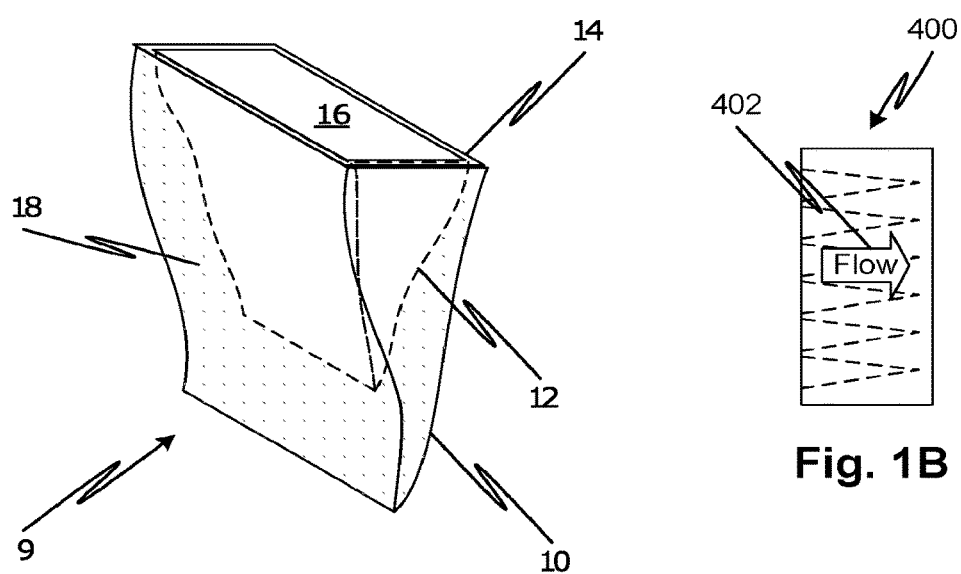
Fig. 2
Fig. 1B

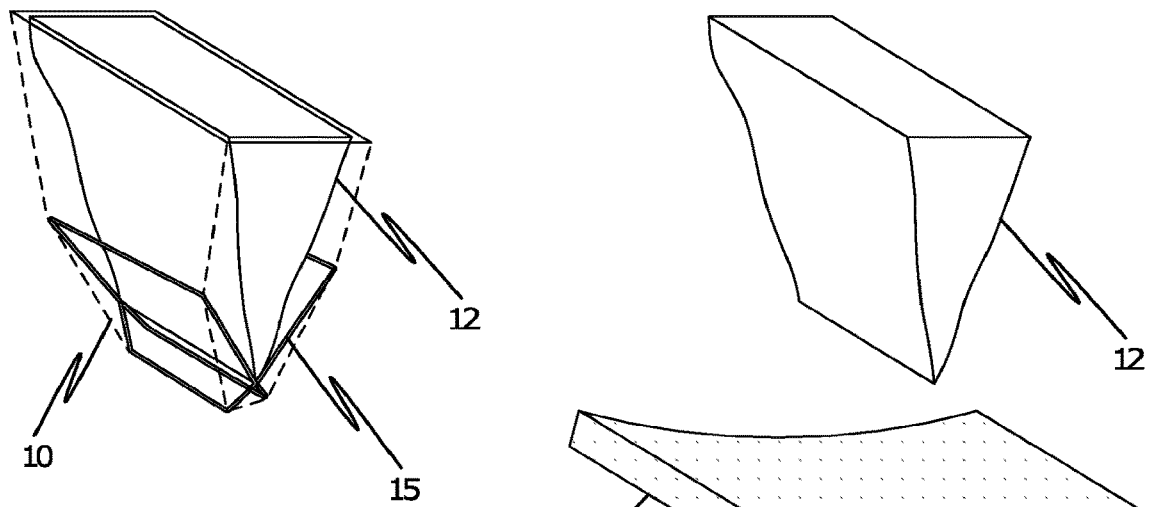
Fig. 3
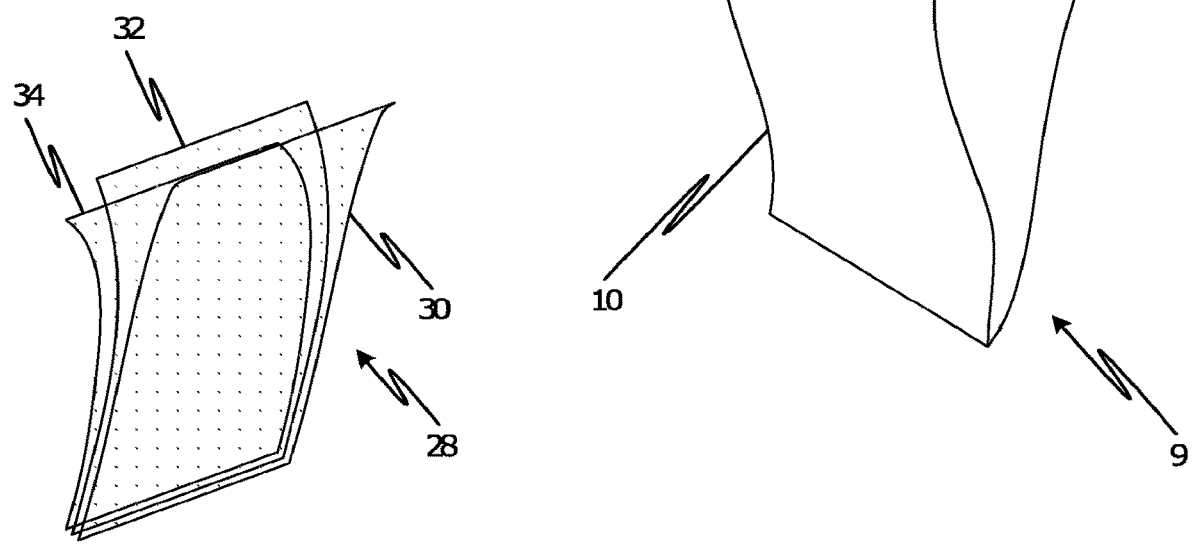
Fig. 4
Fig. 5

FILTER DEVICES METHODS AND SYSTEM

CROSS-REFERENCE TO RELATED APPLICATIONS

This application is a U.S. national stage filing under 35 U.S.C. § 371 of International Application No. PCT/US2016/056204 filed Oct. 9, 2016, which claims the benefit of U.S. Provisional Application No. 62/239,844 filed Oct. 9, 2015, which are incorporated herein by reference in their entirety.

BACKGROUND

Pocket filters are known for the treatment of exhaust and fresh and recirculated air in buildings. Pocket filters are inflated by a pressurized air stream. The pocket configuration affords a large area of material in a compact configuration and to reduce pressure required for a given flow. Known configurations include a set of media pockets supported by a plastic or metal frame that provides an inlet manifold for the multiple pockets. The pockets may be removably mounted.

Pocket filters are widely used for dry particulates. Among things that may be beneficial are reduction in the number of components of pocket filter assembly and simpler assembly as well as convenience.

Pollution control units with pocket filters are used to treat cooking exhaust. They may employ two or more filter stages where each stage is supported in its own frame and is separately replaceable. The stages progress in efficiency starting with a coarse filter to capture the large particles, followed by higher efficiency stages. Each stage loads with contaminants in different proportions, and the lifecycle of each stage becomes nearly independent requiring discrete and frequent maintenance cycle, all adding up significantly to costs of operation. The intent of this successive efficiency is that each stage protects the stage that follows it from large particles that can quickly clog its media structure, thereby achieving balanced lifecycle loading between the stages based on their respective final pressure drop.

SUMMARY

The present invention is directed to a pocket filter assembly. In embodiments, the pocket filter assembly includes a filter header; at least two layers of filter media; and a separator (or spacer) mechanism between the two layers, wherein the first later is adapted for trapping large particles and grease that pass through a primary impact-type grease filter and is of an oil resistant fiber material whose depth is not more than 5 mm. and a second layer of finer material than the first, where the two layers are formed as pocket filter structures with one pocket formed of the first layer positioned inside the pocket of the second layer, wherein the fiber material of the first and second layers is chosen responsively to a kitchen exhaust hood application such that the first and second layers individually load at a rate generating pressure drop increases over time until a predefined threshold is reached, whereby both layers expire at a same time. In embodiments, no separator is employed and the pockets are separated due to dimensional differences upon inflation by air pressure.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIG. 1A shows a pocket filter assembly according to embodiments of the disclosed subject matter.

FIG. 1B shows a pocket filter cartridge with a label to indicate the as-installed direction of air flow.

FIG. 2 shows a pocket portion of the pocket filter of FIG. 1A showing a particular spacer embodiment.

FIG. 3 shows a pocket portion of the pocket filter assembly of FIG. 1A according to a particular spacing device embodiment.

FIG. 4 shows an exploded view of the assembly of FIG. 3 according to embodiments of the disclosed subject matter.

FIG. 5 shows a multilayer filter composite material with an integrated spacer web between them from which a single multilayer pocket may be formed according to embodiments of the disclosed subject matter.

DETAILED DESCRIPTION

Figure 6:
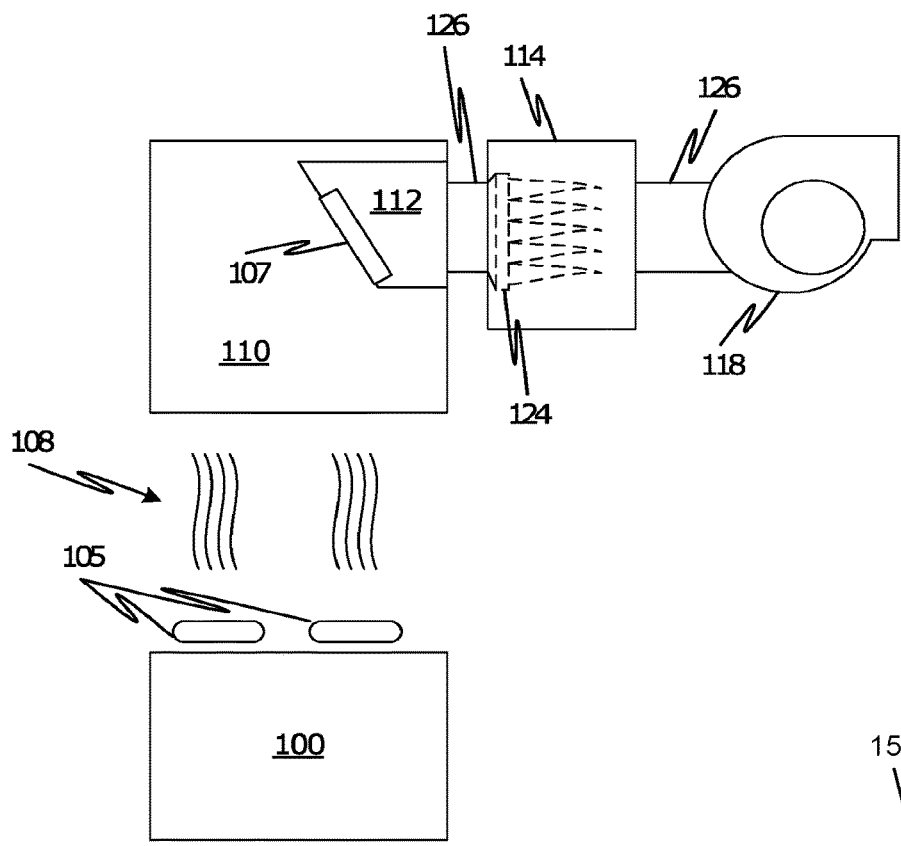
FIG. 6 illustrates an exhaust system in which the pocket filter of the disclosed subject matter is employed, according to embodiments of the disclosed subject matter.

Referring to FIG. 1A, a pocket filter assembly 6 has a plurality of pocket filters 9. Each pocket filter 9 includes a multiple of cascade pockets 10 and 12 as illustrated in FIG. 2 with a separator 18 between them. A frame portion 14 may be provided to define an air inlet 16. The frame portion 14 may be part of a single frame as indicated at 2 in FIG. 1A.

FIG. 1B shows a pocket filter cartridge with a label to indicate the as-installed direction of air flow. This kind of feature is often employed with flow-direction-sensitive filter units. The cartridge is indicated at 400 and the flow direction indication is indicated at 402.

FIG. 3 shows a separator mechanism 15 of welded wire between the first pocket 12 and the second pocket 10. The welded wire separator mechanism 15 may be stitched into an end seam of the first pocket 12. The welded wire separator mechanism 15 may be pre-tensioned to hold the second pocket 10 open and define a gap between the first 12 and second 10 pockets. One composite pocket is shown in FIG. 3 but the configuration may be repeated for all the pockets in an assembly 6.

FIG. 4 shows an exploded view of a separator mechanism employing an open matrix 18 such as a fiber web or a molded structure that packs a space between the first 12 and second 10 pockets without impeding airflow substantially. To assemble, the open matrix 18 may be folded as the first pocket 12 is inserted into the second pocket 10. Metal or plastic framing may be provided for stiffening the elements as required.

FIG. 5 shows a composite material 28 for an alternative construction for a two-layer pocket filter with a first filter layer 34 and a second filter layer 30 separated by an open material 32 which may be textile, honeycomb separator of cardboard or plastic, or fabric to separate them. The latter (32) may be of a hexagonal open cell foam material that allows air to flow between cells or a wire or plastic mesh. A single composite pocket may be formed of the composite material 28 to achieve a similar function as the two pocket system of FIG. 2. The design may be revised using 2 or more layers and multiple cascading pockets may be formed with one or more of them formed of the composite material 28.

FIG. 6 shows a system embodiment with a range 100 cooking food 105 generating pollutants 108 that are captured by an exhaust hood 110. A grease filter, which may be of any type used for capturing grease droplets is indicated at 107, for example, a so-called impact-type filter. A filter plenum 112 is under a negative pressure to draw polluted air through the grease filter 107. The negative pressure is generated by a fan 118 which draws polluted air through ducting 126 connecting a pocket filter chamber 114 housing a pocket filter assembly 124 (such as, for example, assembly 6 shown in FIG. 1A). Pollutants in the polluted air passed by the grease filter 107 are captured by the pocket filter 124. Range 100 and food 105 may be replaced by any type of pollutant source.

As shown, two or more filter pockets 10, 12 fit into a single frame 2 to clean the air in stages. The first stage (first pocket 12) is has a lower efficiency that the second. In embodiments, more than two pockets may be arranged serially, progressing in filtering efficiency. The arrangement yields a compact design that features large filtration surface area within the physical space. By arranging the stages in in order of progressing efficiency and by selecting the filter media such that all of the layers expire (as indicated by pressure drop across them) and responsively to the predicted pollution source, the entire filter 6 can be changed at one time without waste of media. The progression of efficiency is effective to balance the loading of contaminates between the stages and promotes lifecycle for a predefined application, thereby reducing the costs of filtration.

The disclosed subject matter includes a cascaded filter pockets design for use in pollution control units (PCUs) that are employed to filter exhaust air from commercial cooking operations. An embodiment of the latter is illustrated in FIG. 6. The filter media cleans the exhaust air from grease particulates, and can be extended to treat gaseous (non-particulate) pollutants by employing media impregnated with adsorbents. Thus, in embodiments, one or more of the pockets (illustrated by two pockets 10 and 12 but there may be more) may be composed of media that is impregnated with an adsorbent and can be in combination such as activated carbon, potassium permanganate, or zeolites suitable to adsorb the gaseous pollutants for the application.

Figure 7:
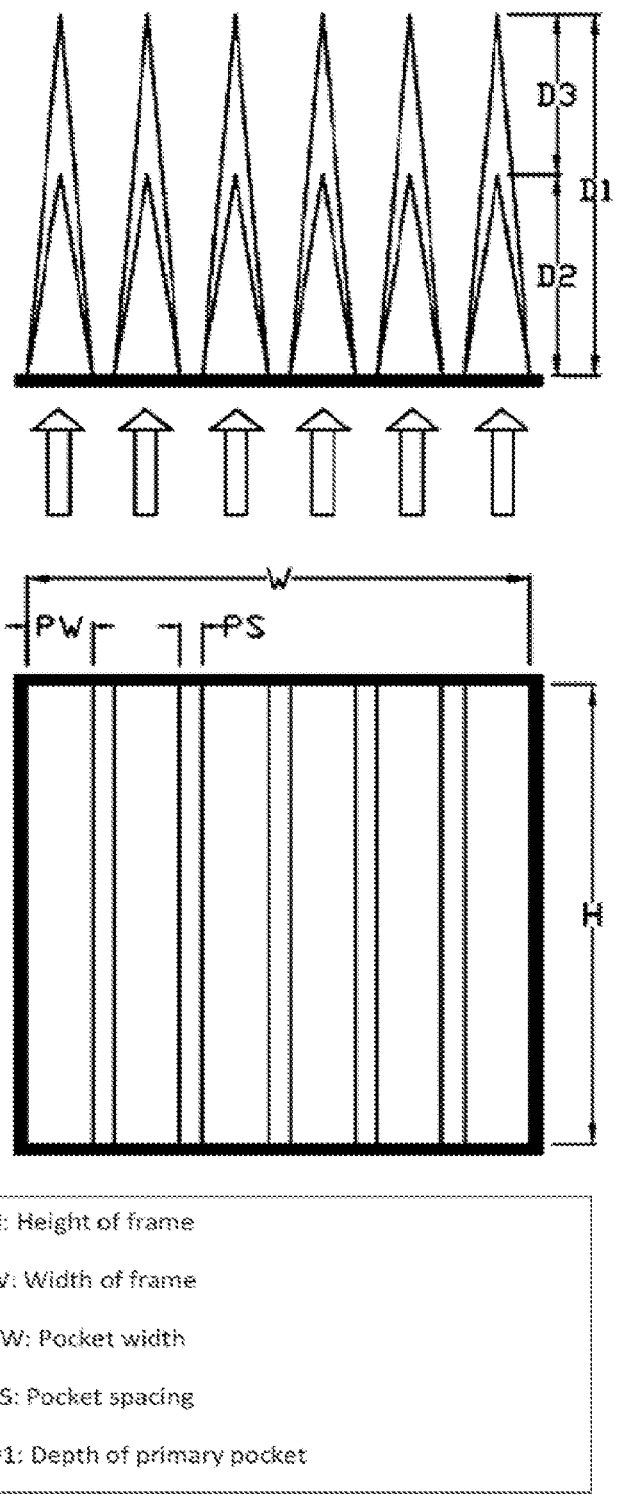
FIG. 7 shows dimension parameters of a pocket filter according to embodiments.

FIG. 7 shows a schematic diagram of a pocket filter assembly. The advantage of the present embodiments can be demonstrated from the following example. Laboratory testing of a three-stage Pollution Control Unit (PCU) with progressive filters efficiency to filter exhaust air from broiling meat shows the first stage pleated panel filter is replaced five times before having to replace the second stage pocket filter. Using the cascade pockets design, replacing the first stage pleated panel filter with a pocket within the second stage pocket can reduce the maintenance cycle to one.

According to embodiments, the media may comprise fiberglass, wool, or synthetic media. The media may be of polypropylene lofted microfiber, for example. The filter frame may be formed using welded wire, injection molded plastic, or other material known in the art. In an embodiment, a two layer filter includes Minimum Efficiency Reporting Value (MERV) 9 media ("MERV9 media") in the first pocket 12 and MERV 14 media in the second pocket.

Note that in any of the embodiments, the separator between first and second (and further) pockets may be omitted and the inflation by exhaust flow may provide a separation between the pockets where the pockets are formed of different depths such that they are separated by inflation. I.e., D3-D2 as shown in FIG. 7. Pocket spacing (PS) in FIG. 7 provides clearance between each cascaded pockets when they are inflated. If they touch at the leading portions of the pockets when they are inflated, it impedes airflow creating significant pressure resistance to the filter assembly.

Figure 8A:
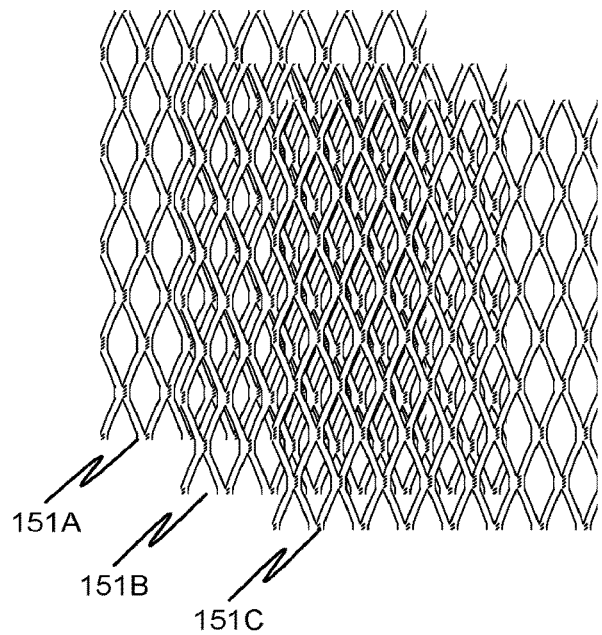
FIGS. 8A and 8B show a spacer structure, according to embodiments of the disclosed subject matter.
Figure 8B:
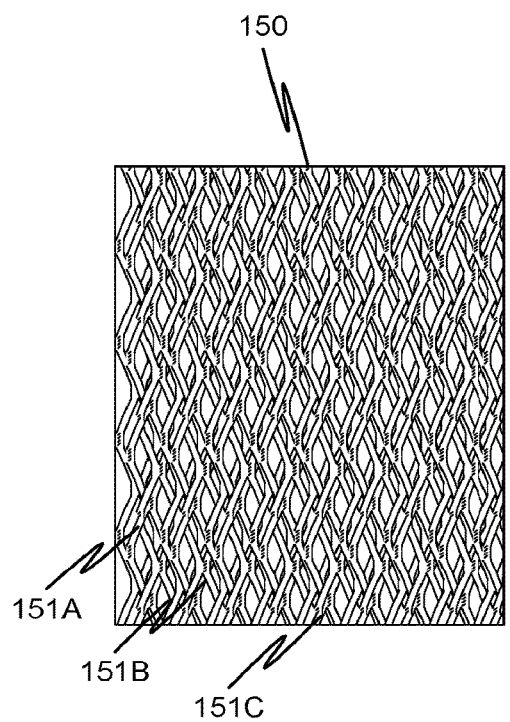

FIGS. 8A and 8B show a spacer of three layers of expanded sheet material 151A, 151B, and 151C that are layered on top of each other to form a spacer 150. Fewer or more layers can be included to form a spacer. The layers 151A, 151B, and 151C may be offset relative to each other. The open area may be greater than 50%. The total depth may be greater than 3 mm. The sheet may be of paper, cardboard, plastic, or other materials. Structurally similar materials may be used as spacers in the various embodiments. The expanded sheets may be corrugated so that they form an open three-dimensional lattice-like structure with relatively low surface. In embodiments using metal as the expanded sheet material, the configuration may be used to form mesh filters which may be used in a preferred system embodiment described below with reference to FIG. 11.

Figure 9A:
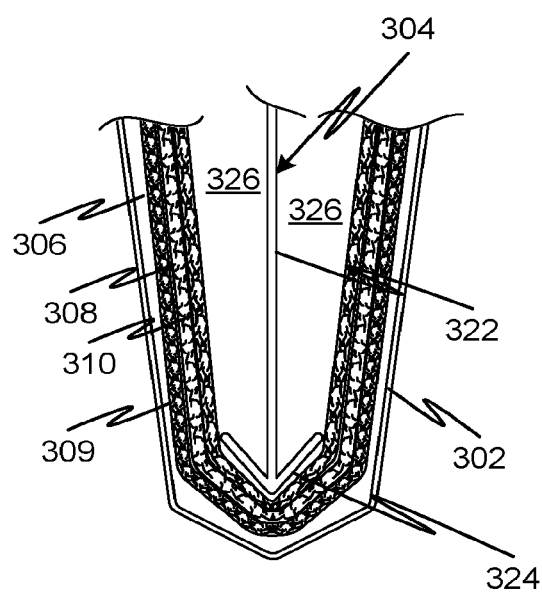
FIGS. 9A-9E show pocket media and support features of various pocket filter embodiments.

FIGS. 9A-9D show pocket media and support features of various pocket filter embodiments. Each of the FIGS. 9A to 9D illustrates the tip of a single pocket but will be understood to describe the identified features in the construction of a complete pocket filter otherwise incorporating any combination of the features of the embodiments described herein or compatible features of prior art embodiments, in any and all combinations. Referring to FIG. 9A, a filter media is formed of three layers which may be bonded together or simply adjacent each other. A first filtration layer 310 is on the inside of the pocket so that a gas stream to be filtered passes through the first filtration layer 310 first. The first filtration 310 layer may be of unwoven open fabric with high loft and relatively low filter efficiency compared to a second filtration layer 306 which is the last layer that gas streams pass through. The second filtration layer 306 may be of similar material except that its filter efficiency is significantly higher than that of the first filtration layer 310. A separation layer 308 functions as a separation layer and, in the present embodiment, is of similar construction to the first and third filtration layers but with a lower efficiency than the first filtration layer 310.

Figure 12:
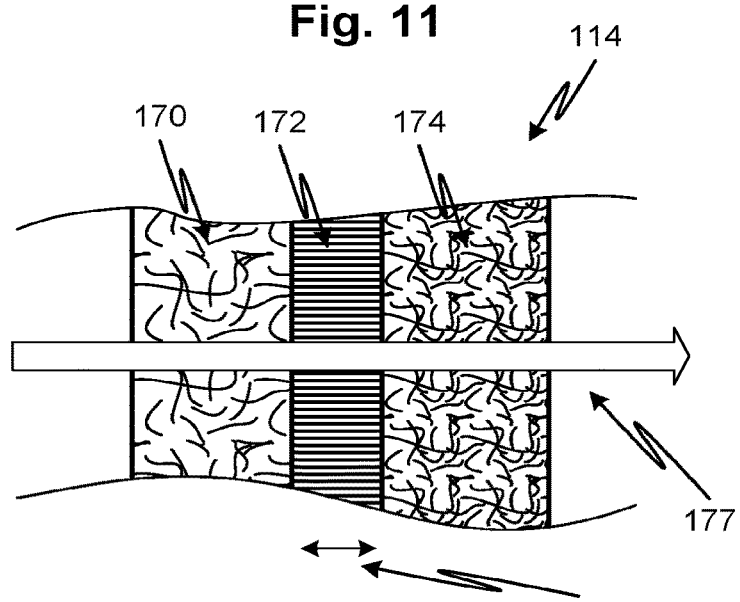
FIG. 12 shows a feature of pocket filter media construction according to embodiments of the disclosed subject matter.

A feature of the embodiment of FIG. 9A (and further embodiments disclosed) will now be described with reference to FIG. 12. The first filtration layer 310 corresponds to first filtration layer 170 and the second filtration layer 306 corresponds to first filtration layer 174. The separation layer 308 corresponds to separation layer 172. In the example of FIG. 9A, the layers 306-310 were described as differing in terms of relative filter efficiency. The filter efficiency is relevant with respect to the differentiation between the first and second filtration layers 170 and 174 (as well as 310 and 306). The high filtration efficiency of second filtration layer 170 relative to that of second filtration layer 174 facilitates uniform loading of the filter layers in a grease environment because grease aerosols tend to stick aggressively even to relatively open or low efficiency media. Thus even very low efficiency media is quite efficient at capturing grease. The openness however allows the second filtration layer 170 to continue to allow fumes to flow through without getting blocked very quickly so that the second filtration layer 174 can contribute the overall capacity of the combined media 114 as well as remove the smaller particles.

With regard to the embodiment of FIG. 9A, the separation layer 308 was described as having a lower efficiency than filtration layer 308. However, a key function of separation layer 172 (corresponding to separation layer 308) is to prevent the wicking of grease from the low efficiency media of second filtration layer 170 to the high efficiency media second filtration layer 174. Thus, the separation layer 172 characteristic is the relative strength of wicking forces between the two media. By providing that second filtration layer 170 produces lower forces than second filtration layer 170, the separation layer 172 allows the arrangement of media with higher wicking forces second filtration layer 174 adjacent and downstream of media with lower wicking forces second filtration layer 170.

In embodiments, the separation layer 172 has a lattice or cellular structure that prevents any turbulence (or incipient turbulence such as eddies) that might otherwise scour grease captured by first filtration layer 170 and convey it by convection to second filtration layer 174. The prevention of any turbulence or any type of separation characteristic of incipient turbulence or laminar breakdown) may also be guaranteed by selection of flow rate and characteristic flow dimension. A worst-case candidate for the latter may be the width of the separation layer 172 indicated at 175 however the structure of the separation layer 172 will play a role as well. In embodiments, the separation layer 172 may also play a role in creating resistance to flow such that flow in lateral directions (i.e., perpendicular to the main flow 177 direction) is prevented or at least strongly suppressed. This may prevent a mean flow that might cause transfer or detachment of grease from the second filtration layer 170.

The above discussion of the media 114 characteristics in terms of relative wicking forces may translate to the embodiment of FIG. 9A (and others) in terms of filter efficiency. In other words, higher efficiency media (more tightly packed or higher density) will have higher wicking forces (capillary forces). So the relative efficiency of the layers translates in terms of wicking forces for similar types of media, at least.

In the above and any of the embodiments, the filtration layers may be of spun glass with phenolic resin to bind the glass fibers. In alternative embodiments the filtration layers may be of polymer fibers such as polyester. Other materials may be used to form open cell non-woven high loft fabrics.

Returning now to FIG. 9A and referring also to FIGS. 14A through 14D, an inner frame 352 provides mechanical support for the multiple layer media 114, 309. The inner frame 352 is indicated at 304 in FIG. 9A. The inner frame 304 includes a main spar 322 and a tip spreader 324 that holds an internal space 326 open. An outer frame 354 may be of a wire or any other suitable materials. The outer frame supports the second filtration layer 174 in turn supporting the first filtration layer 170 and separation layer 172. In the embodiment of FIG. 9A, the outer frame 302 supports the second filtration layer 309 in turn supporting the first filtration layer 310 and the separation layer 308. The inner 352 and outer 354 frames may of welded wire, plastic or any other suitable materials. Similarly, for outer frames 356 and 358 which may also be of expanded sheet, chicken-wire fencing (twisted wire mesh) type materials or other.

In embodiments, the outer frame provides a device for allowing the media to be of a looser and more open construction which may be elastic enough to tend to expand until it fails. In other embodiments, or similar embodiments, the outer frame may prevent the media from stretching to bridge gaps between adjacent pockets as illustrated in FIG. 9E where 370 indicates adjacent pockets in a relaxed state and 372 indicates adjacent pockets after being pressurized by an exhaust system.

Figure 9C:
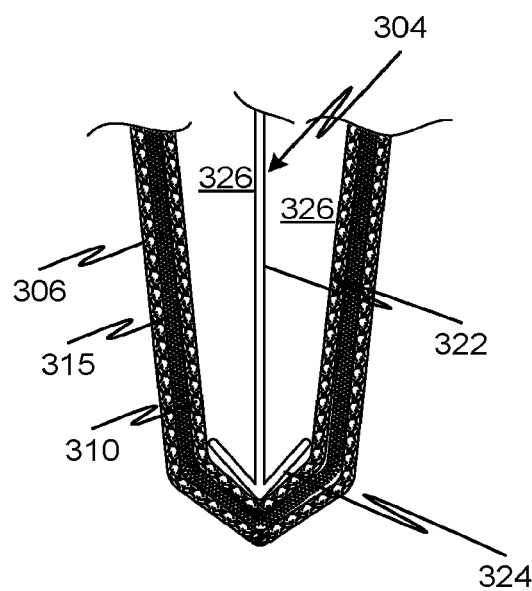
Figure 9E:
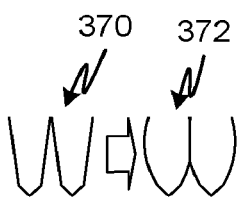
Figure 9B:
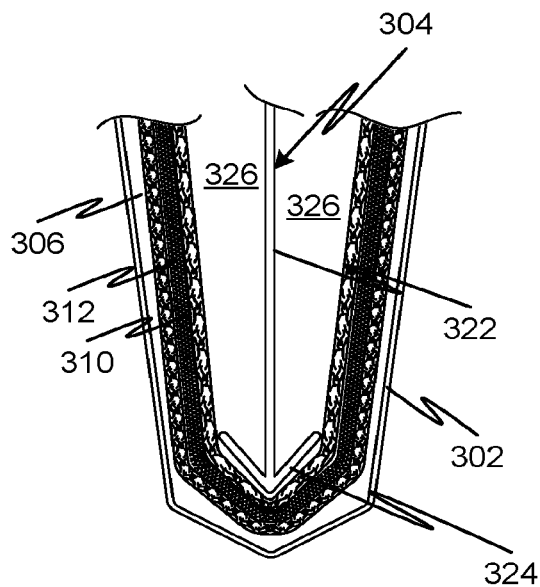

FIG. 9B shows an embodiment that is similar to that of FIG. 9B except that the material of a separation layer 312 (otherwise having the properties of separation layer 308 or 172, is of a different type of textile or material from filter media of filtration layers 306 and 310. This differs from the embodiment of FIG. 9A where the media 309 layers are all fundamentally the same but of different efficiencies (that is, including manifest wicking forces). Examples of materials that may be used are flexible embodiments of spacer 150 of expanded sheet (including corrugated variants thereof).

FIG. 9C shows another variant that lacks an outer frame 302. In embodiments like that of FIG. 9C, the separation layer 315 may be a material selected for high tensile strength that it can be drawn tightly over the inner frame 304. This may prevent or mitigate the bulging effect described with reference to FIG. 9E. The layers first filtration layer 306 and second filtration layer 310 may be bonded to the high tensile strength separation layer 315. The combination of the bonding and high tensile strength of the spacer may provide an alternative to the outer frame 302 while still enjoying the benefit. The example of spacer 150 would provide the high tensile strength. An open weave fabric like fishnet, optionally with a spacer material having lower wicking strength than first filtration layer 310 may be employed. Other examples will be evident to those of skill in the art.

Figure 9D:
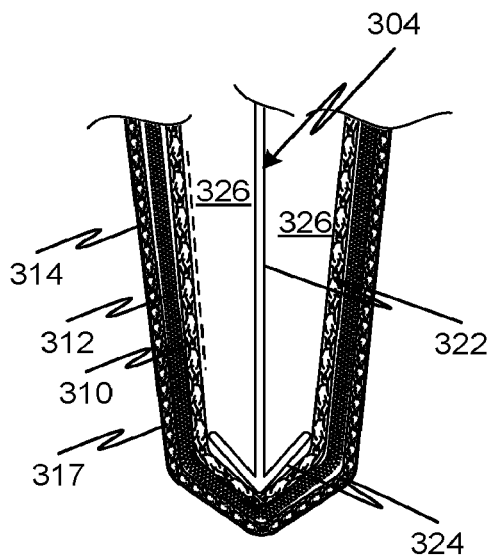

FIG. 9D shows another variation in which a backing layer 317 is provided on the second filtration layer 314. This backing layer 317 may be, for example, a non-woven cloth that is adhesively laminated to the filtration media of second filtration layer 314. The high tensile strength may permit the omission of the outer frame 302. The backing layer is advantageously provided on the outside and as such may permit a high efficiency material to be used at the point of exit of the second filtration layer 314. If such a backing were used in the first filtration layer 310 or upstream of the final layer of media, it may clog quickly and destroy the long filter life benefits of the disclosed embodiments, underutilizing the downstream media therefrom.

Figure 10A:
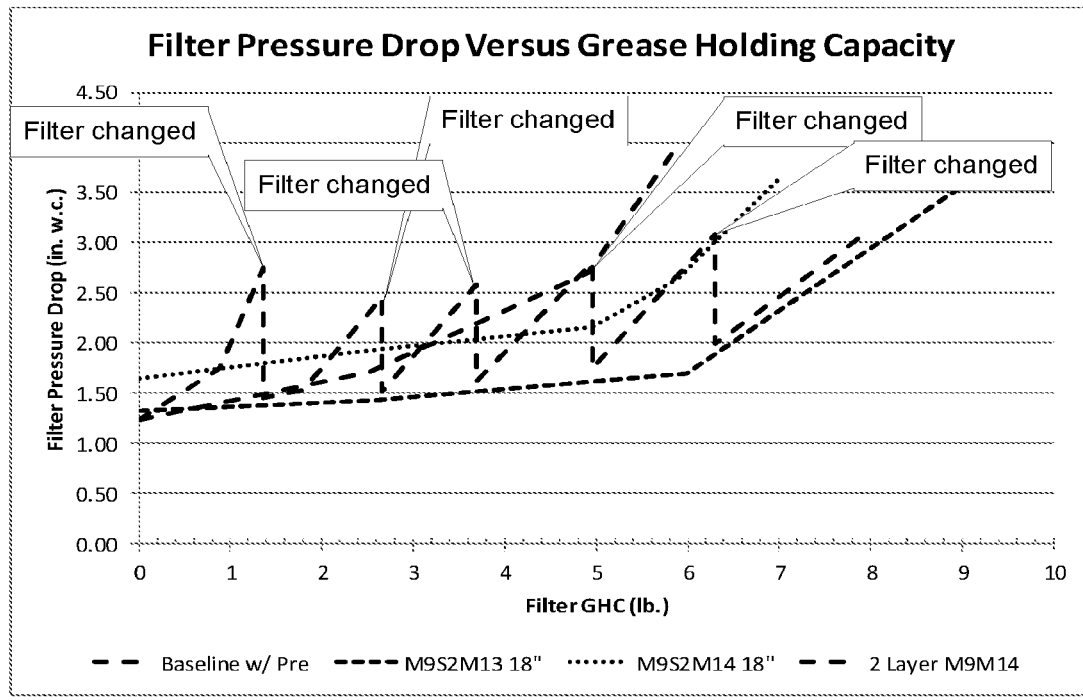
FIGS. 10A-10B show the results of tests of pocket filters according to prior art benchmark and prototype embodiments of the disclosed subject matter.
Figure 10B:
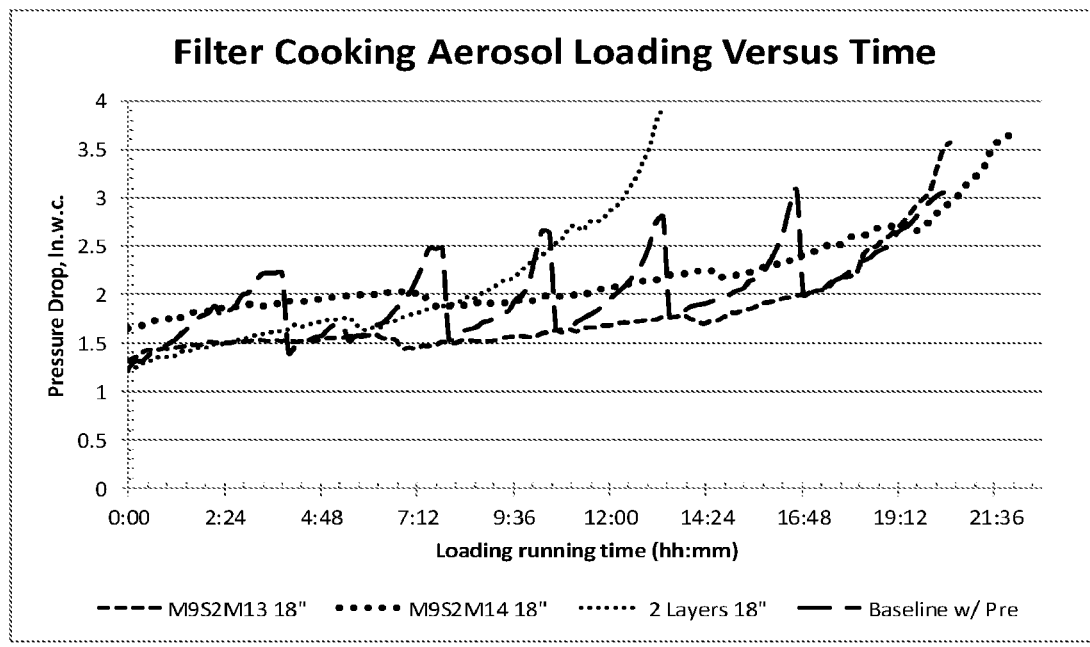

FIGS. 10A-10C show the results of tests of pocket filters according to prior art benchmark and prototype embodiments of the disclosed subject matter. Referring to FIG. 10A, the chart shows the mass accumulated on various filter media formed into pocket filters as a function of the pressure drop. A filter that accumulates a great deal of filtrate mass for a given pressure drop will require less frequent replacement as the gain in pressure drop is usually the condition that forces filters to be replaced. It will be observed that a baseline media which lacks the multiple filtration layer characteristics of the foregoing embodiments loads with a low mass before the pressure drop increases to a level at which is changed which is indicated at five different total masses of accumulated filtrate (the mass here being cumulated between filter changes to illustrate the relative effectiveness of the inventive filter media examples). The following lists the structure of the various examples.

Baseline w/pre: Baseline case, two filters, a pleated panel 2 inches deep and single layer 8 pockets filter 15 inches deep, overall depth of both filters is 18 inches.

M9S2M13 18": Prototype multilayer 8 pockets filter, each pocket 18 inches deep, MERV 9 glass fiber for the inner pocket, followed by highly open porous structure polyester separating layer, followed by a final MERV 13 glass fiber outer layer.

M9S2M14 18": Prototype multilayer 8 pockets filter, each pocket 18 inches deep, MERV 9 glass fiber for the inner pocket, followed by highly open porous structure polyester separating layer, followed by a final MERV 14 glass fiber outer layer M9M14: Traditional 2 layers 8 pockets filter, each pocket 18 inches deep, MERV 9 glass fiber for the inner pocket, followed by a MERV 14 glass fiber layer that in contact.

It will also be observed that the most efficient embodiments, from a loading standpoint, are the two with separation layers of open porous polyester. The baseline has a pleated filter with a single-layer pocket 15 inches deep. The M9S2M13 loaded more than the M9S2M13 but both outperformed the others, the baseline and the two layer pocket lacking a separation layer M9M14, where the two layers were in direct contact. FIG. 10B shows the same examples in a pressure drop vs running time format. It will be observed that the two embodiments with separator layers had the longest running time before high pressure drop required a filter change. The multiple peaks of the baseline show the number of filter changes here as in the foregoing figure.

Figure 11:
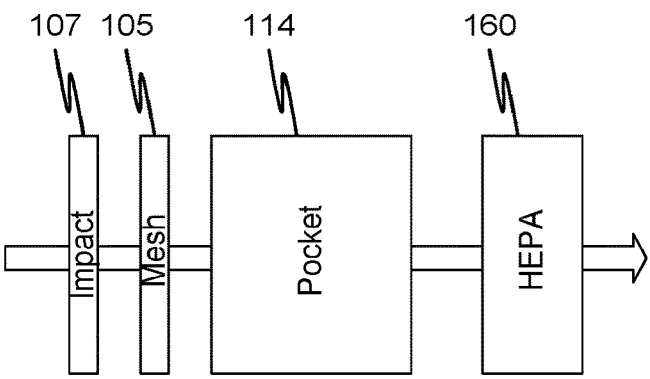
FIG. 11 illustrates an application context of the disclosed pocket filter embodiments.

FIG. 11 illustrates an application context of the disclosed pocket filter embodiments. An impact filter 107 such as the cartridge filters used in exhaust hoods for grills, is used as a first stage. A mesh filter such as a metal embodiment of 150 may be used as a second stage. Then a pocket filter 114 according to the disclosed embodiments is used as a third stage. Then a high efficiency particulate arrestance (HEPA) filter such as a pleated filter is used as a fourth stage. In embodiments, these are particularly useful in low pollution-tolerant applications such as non-vented kiosk type grills.

Figure 13:
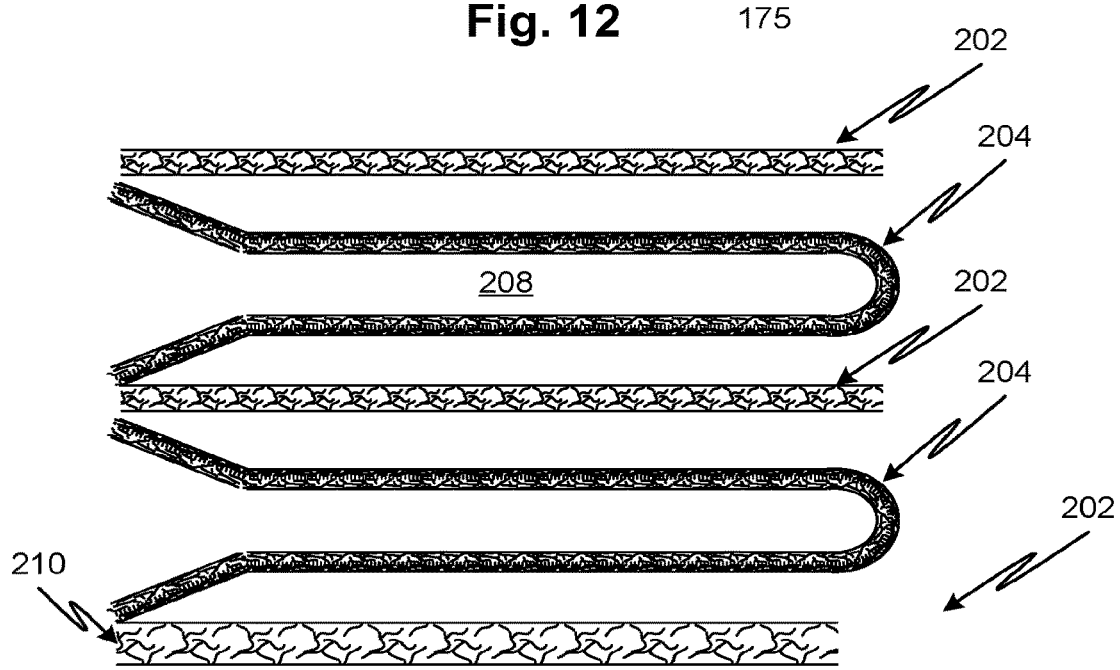
FIG. 13 illustrates a pocket filter in cross-section for describing features for ensuring free gas flow through pocket filters according to embodiments of the disclosed subject matter.
Figure 14A:
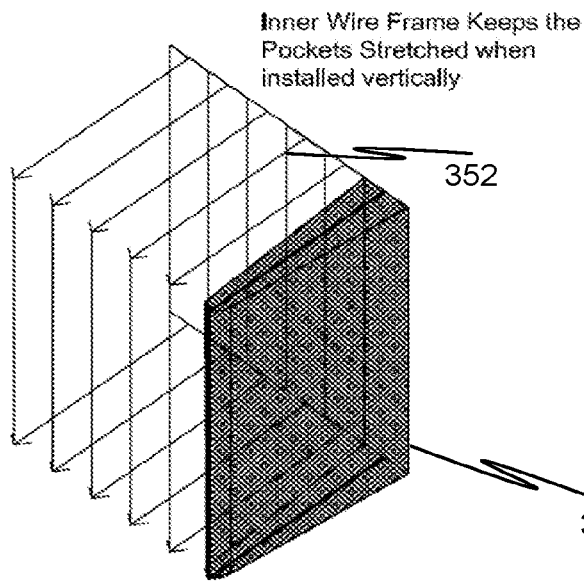
FIGS. 14A-14D illustrate various frame structures that contribute to ensuring free gas flow through pocket filters according to embodiments of the disclosed subject matter.
Figure 14B:
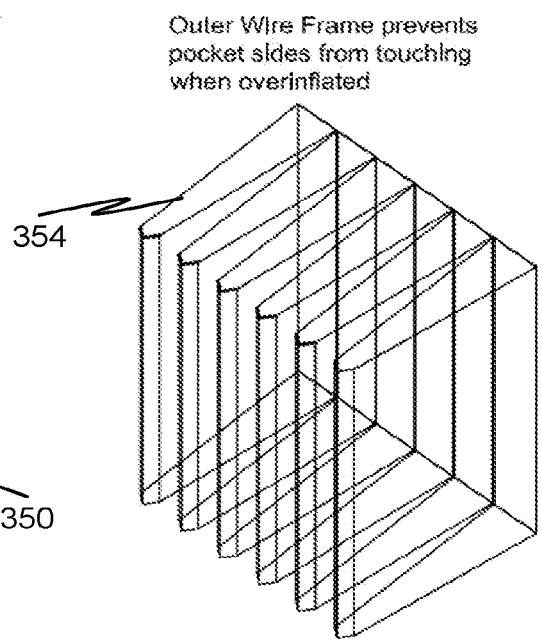
Figure 14C:
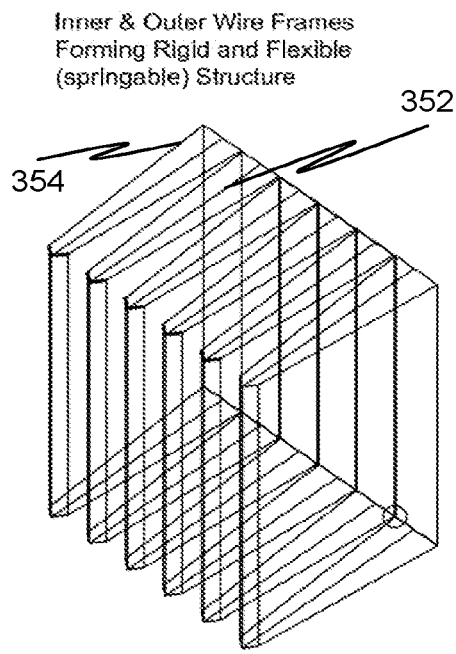
Figure 14D:
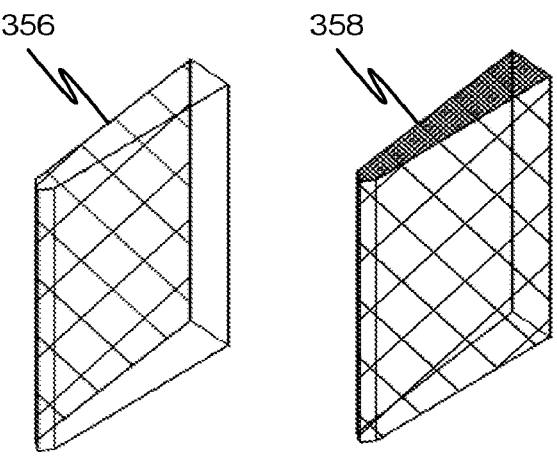

FIG. 13 illustrates a pocket filter in cross-section for describing features for ensuring free gas flow through pocket filters according to embodiments of the disclosed subject matter. A multilayer pocket of the construction of FIG. 11, for example, is used to form pockets. Between the pockets are expansion barriers 202 which of open porous mesh for example otherwise used as filter media or separation layer in embodiments. The expansion barriers 202 permit unimpeded flow of gas out of the filter pocket 204 sides even when the filter pockets 204 inflate by preventing the side walls from bulging as illustrated in FIG. 9E and starving gas flow. The thickness of the expansion barriers 202 can be greater or smaller than a corresponding spacer layer of the pocket filter 114 media as indicated at 210 which shows a thicker expansion barrier 202 material.

Figure 15A:
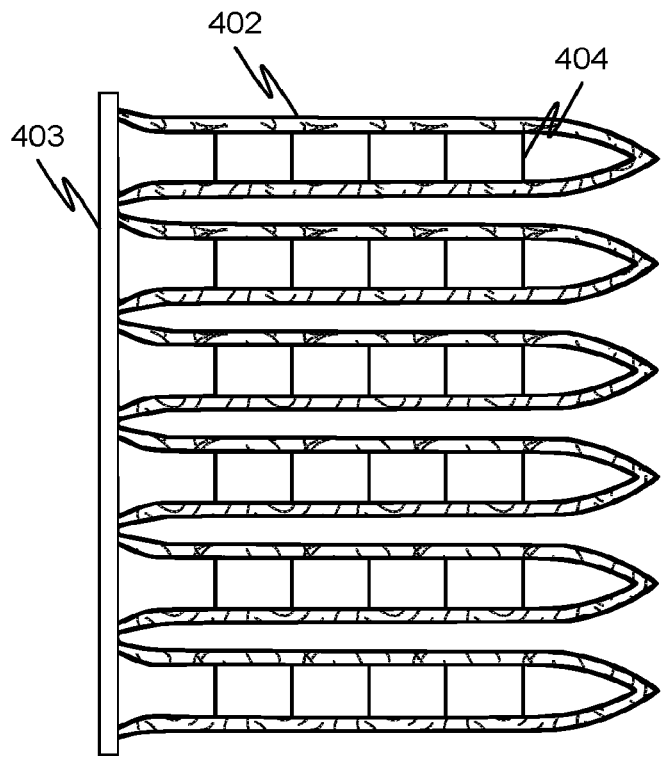
FIGS. 15A-15C illustrate further features that contribute to ensuring free gas flow through pocket filters according to embodiments of the disclosed subject matter.
Figure 15B:
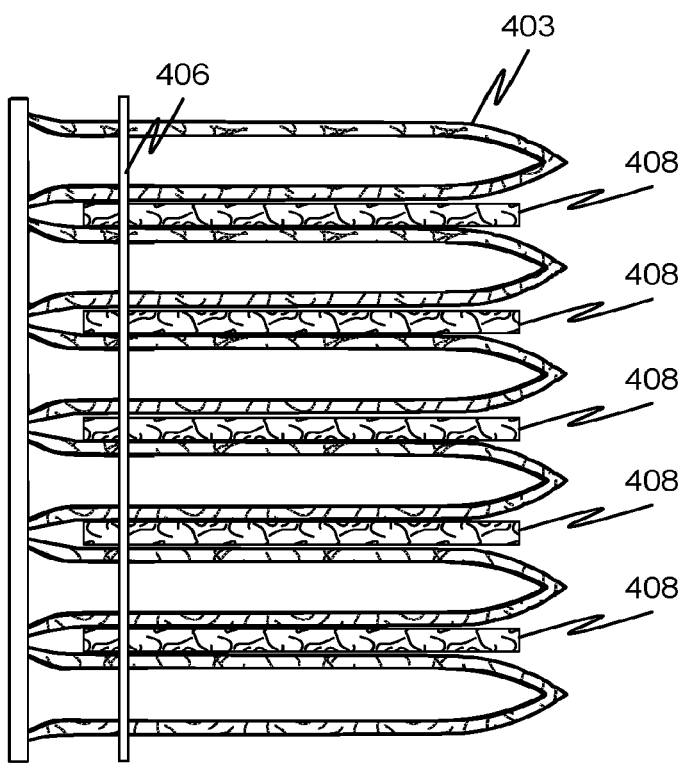
Figure 15C:
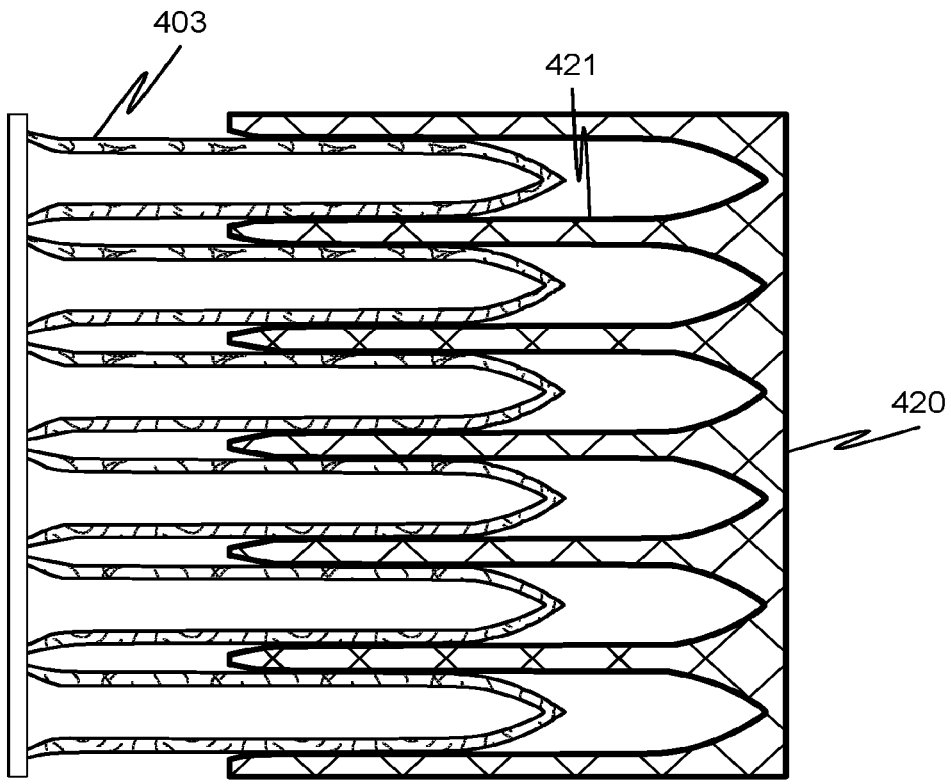

FIGS. 15A and 15C illustrate further features that contribute to ensuring free gas flow through pocket filters according to embodiments of the disclosed subject matter. Referring to FIG. 15A, pockets 402 of media according to any of the various embodiments has internal retainers 404 which may be threads, for example, to prevent the expansion of the pockets as described with reference to FIG. 9E. Here, a frame 403 is shown to which the pockets are attached. These features may be combined with any of the others disclosed to form additional embodiments. FIG. 15B shows illustrates a way to provide for the expansion barriers 408 which may be inserted and fastened to be held in place by one or more skewers 406. FIG. 15C shows another mechanism for preventing the expansion of the pockets as described with reference to FIG. 9E. An open frame 420 is with tongues 421 that function as expansion barriers is inserted between the pockets 403. The frame 420 may also provide the function of supporting the outer pockets to permit the use of very open media with low tensile strength. For example, the glass fiber type media has this characteristic, particularly when it lacks a backing.

Figure 16A:
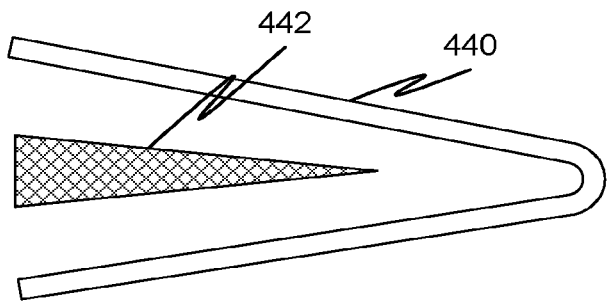
FIGS. 16A and 16B show a structure and method of forming a pocket of a pocket filter according to embodiments of the disclosed subject matter.
Figure 16B:
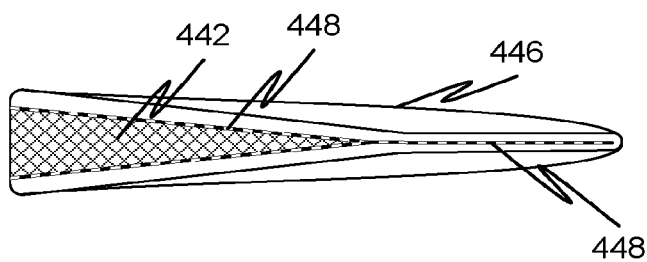

FIGS. 16A and 16B show a structure and method of forming a pocket of a pocket filter according to embodiments of the disclosed subject matter. A single sheet of media (which may be comprised of multiple layers as taught herein) 440 is folded with a web 442 which may be of triangular shape positioned as indicated. Then the edges of the folded sheet are stitched together as indicated at 447 at a tip of the pocket and then to the web 442 toward the root of the pocket. The sheet may continue unbroken to form multiple adjacent pockets of a bullet shape as shown in FIGS. 15A-16B.

According to first embodiments, the disclosed subject matter includes a filter for filtering a pollutant stream. A pocket filter has a first pocket of a first media material having a thickness of less than 20 mm and of oil-compatible material. The pocket filter includes a second pocket of a second media material having a thickness of less than 20 mm and of oil-compatible material. The second pocket second media material is of higher efficiency than said first. The first pocket is fitted within the second and has a depth that is shorter than the second pocket and having a spacer that provides clearance between the first and second pockets, the spacer having openings of at least 2 mm in size with an open area fraction greater than 50% and a depth that defines a minimum spacing of at least 3 mm.

The first embodiments may be modified to form additional first embodiments that include an open separation material between the first and second pockets effective to define an air gap between all points of the first pocket and all points of the second pocket. The first embodiments may be modified to form additional first embodiments in which the separation material includes a plastic foam lattice. The first embodiments may be modified to form additional first embodiments in which the separation material includes a wire frame. The first embodiments may be modified to form additional first embodiments in which the wire frame is attached to the first pocket. The first embodiments may be modified to form additional first embodiments in which the first pocket is of MERV 9 media and the second pocket is of MERV 14.

According to second embodiments, the disclosed subject matter includes an exhaust system with a filter for filtering a pollutant stream. An exhaust hood with a grease filter and ductwork is adapted to support a pocket filter downstream of the grease filter. A grease filter in an exhaust network is followed by a pocket filter. The pocket filter includes a first pocket of a first media material having a thickness of less than 20 mm and of oil-compatible material. The pocket filter includes a second pocket of a second media material having a thickness of less than 20 mm and of oil-compatible material. The second pocket second media material is of higher efficiency than said first.

The second embodiments may be modified to form additional second embodiments that include an open separation material between the first and second pockets effective to define an air gap between all points of the first pocket and all points of the second pocket. The second embodiments may be modified to form additional second embodiments in which the separation material includes a plastic foam lattice. The second embodiments may be modified to form additional second embodiments in which the separation material includes a wire frame. The second embodiments may be modified to form additional second embodiments in which the wire frame is attached to the first pocket. The second embodiments may be modified to form additional second embodiments in which the first pocket is of MERV 11 media and the second pocket is of MERV 14. The second embodiments may be modified to form additional second embodiments in which the first pocket fits within the second and having a depth that is shorter than the second pocket such that there is a stream-wise separation distance between the downstream end of the first pocket and the second pocket that is at least 15% of the stream-wise depth of the first pocket such that upon inflation due to air flow, the first and second pockets are substantially separated.

According to third embodiments, the disclosed subject includes a filter for filtering a pollutant stream. A pocket filter includes a first pocket of a first media material having a thickness of less than 20 mm and of oil-compatible material. The pocket filter includes a second pocket of a second media material having a thickness of less than 20 mm and of oil-compatible material. The second pocket second media material is of higher efficiency than said first. The first pocket fits within the second and has a depth that is shorter than the second pocket such that there is a stream-wise separation distance between the downstream end of the first pocket and the second pocket that is at least 15% of the stream-wise depth of the first pocket such that upon inflation due to air flow, the first and second pockets are substantially separated.

The third embodiments may be modified to form additional third embodiments that include an open separation material between the first and second pockets effective to define an air gap between all points of the first pocket and all points of the second pocket. The third embodiments may be modified to form additional third embodiments in which the separation material includes a plastic foam lattice. The third embodiments may be modified to form additional third embodiments in which the separation material includes a wire frame. The third embodiments may be modified to form additional third embodiments in which the wire frame is attached to the first pocket. The third embodiments may be modified to form additional third embodiments in which the first pocket is of MERV 9 media and the second pocket is of MERV 14.

It will be evident from the foregoing that the separation layer (or separator or spacer or as otherwise identified) may be of a variety of constructions. Preferably it is of high flexibility. The thickness may be determined by experiment to be sufficient to inhibit or prevent wicking. The relative efficiency of the first and second filtration layers may be chosen such that under test conditions, the two load approximately the same mass at the point of expiration. In embodiments, the first filtration layer may have a MERV rating of 8 or less and the second filtration layer may have a MERV rating of 13 or higher. In embodiments, the first filtration layer may have a MERV rating of 6 or less and the second filtration layer may have a MERV rating of 13 or higher. In embodiments, the latter embodiments are of glass fiber such as used in air filtration filters.

In order to characterize different materials having different tendencies to wick a target liquid, the term wicking strength may be used. A material with a higher wicking strength produces stronger capillary forces than a material with a lower wicking strength. If the materials are placed adjacent one another, the tendency of the liquid to migrate from a high wicking strength material to a low wicking strength material will be lower than the tendency to migrate in the reverse direction. The wicking strength may be a property of the material surface (nano surfaces textures that are, for example, hydro- or lipo-phobic), structure (e.g., density of fibers or size of pores), or composition (polymeric, glass, metallic, fabric yards, etc.).

As used herein, MERV rating refers to the definition of American Society of Heating Refrigeration, and Air Conditioning Engineers (ASHRAE) § 52.2.

According to first embodiments, the disclosed subject matter includes a filter with first and second filtration layers of filtration material adjacent a separation layer where the separation layer has a lower wicking strength than the first filtration layer. The filter has a preferred installation direction such that gas flows from the first filtration layer to the second filtration layer.

The first embodiments include variations that include a support frame, wherein the preferred installation direction is indicated on the support frame.

The first embodiments include variations in which the first and second filtration layers include glass or polymeric fiber in unwoven form.

The first embodiments include variations in which the first and second filtration layers include bonded glass or polymeric fiber in unwoven form.

The first embodiments include variations in which the first and second filtration layers include glass or polymeric fiber in unwoven form forming a high loft open cell matrix.

The first embodiments include variations in which the first filtration layer has a higher wicking strength than the second filtration layer.

The first embodiments include variations in which the first and second filtration layers and the separation layer form a single multilayered textile.

The first embodiments include variations in which the first and second filtration layers and the separation layer form a single multilayered textile sheet formed into pockets.

The first embodiments include variations in which the first and second filtration layers and the separation layer form pockets arranged as a pocket filter.

The first embodiments include variations in which the first and second filtration layers and the separation layer form pockets of a pocket filter, further comprising an open cell material between the pockets and positioned to prevent the walls of adjacent pockets from directly contacting, the open cell material permitting gas to flow therethrough.

The first embodiments include variations in which the first and second filtration layers and the separation layer form pockets of a pocket filter, further comprising a frame with respective portions extending into the interiors of each of the pockets.

The first embodiments include variations in which the first and second filtration layers and the separation layer form pockets arranged as a pocket filter and the first filtration layer is of uniform structure while the second filtration layer has a backing of higher tensile strength than a remainder of the second filtration layer, whereby the second filtration layer supports the first filtration layer and the separation layer.

The first embodiments include variations in which the first and second filtration layers and the separation layer form pockets arranged as a pocket filter and the first filtration layer and second filtration layer are of uniform structure without a backing of higher tensile strength than a remainder of the first or second filtration layer, the separation layer has a higher tensile strength than the first or second filtration layers, and the first and second filtration layers are bonded to the separation layer, whereby the separation layer supports the first and second filtration layers.

The first embodiments include variations in which the first and second filtration layers and the separation layer form pockets arranged as a pocket filter and the first filtration layer and second filtration layer are of uniform structure without a backing of higher tensile strength than a remainder of the first or second filtration layer, further comprising an external frame surrounding each pocket and preventing the walls of adjacent pockets from contacting each other due to inflation.

The first embodiments include variations in which the first and second filtration layers are bonded to the separation layer.

The first embodiments include variations in which the first and second filtration layers and the separation layer form pockets of a pocket filter, further comprising a second frame with respective portions extending into the interiors of each of the pockets.

According to second embodiments, the disclosed subject matter includes a filter fabric that has first, second, and third layers of open cell material. The first layer has a lower efficiency for particle capture than the third. the first layer has a lower wicking strength than the third. The second layer lies between the first and second layers. The second layer has a lower wicking strength than the first layer.

The second embodiments include variations in which the first and second layers are of non-woven textile.

The second embodiments include variations in which the first and second layers are of bonded glass fiber.

The second embodiments include variations in which the first and second layers are of bonded polymer fiber.

The second embodiments include variations in which the filter fabric is shaped into pockets.

The second embodiments include variations in which the filter fabric is shaped into pockets.

According to third embodiments, the disclosed subject matter includes a filter for filtering a pollutant stream. A pocket filter has a first pocket of a first media material has a thickness of less than 20 mm and of oil-compatible material. The pocket filter includes a second pocket of a second media material has a thickness of less than 20 mm and of oil-compatible material. The second pocket second media material is of higher efficiency than the first. The first pocket fits within the second and has a depth that is shorter than (or the same length as) the second pocket and has a spacer that provides clearance between the first and second pockets, the spacer has openings of at least 2 mm in size with an open area fraction greater than 50% and a depth that defines a minimum spacing of at least 3 mm.

The third embodiments include variations that include an open separation material between the first and second pockets effective to define an air gap or flow resistant medium between all points of the first pocket and all points of the second pocket.

The third embodiments include variations in which the flow resistant medium has a lower wicking strength than the media of the first pocket.

The third embodiments include variations in which the separation material includes a plastic foam lattice.

The third embodiments include variations in which the separation material includes a wire frame.

The third embodiments include variations in which the wire frame is attached to the first pocket.

The third embodiments include variations in which the first pocket is of MERV 9 media and the second pocket is of MERV 14.

According to fourth embodiments, the disclosed subject matter includes an exhaust system with a filter for filtering a pollutant stream. An exhaust hood has a grease filter and ductwork adapted to support a pocket filter downstream of the grease filter. A grease filter is positioned in an exhaust network followed by a pocket filter. The pocket filter includes a first pocket of a first media material that has a thickness of less than 20 mm and of oil-compatible material. The pocket filter includes a second pocket of a second media material that has a thickness of less than 20 mm and of oil-compatible material. The second pocket second media material is of higher efficiency than the first.

The fourth embodiments include variations that include an open separation material between the first and second pockets effective to define an air gap between all points of the first pocket and all points of the second pocket.

The fourth embodiments include variations in which the separation material includes a plastic foam lattice.

The fourth embodiments include variations in which the separation material includes a wire frame.

The fourth embodiments include variations in which the wire frame is attached to the first pocket.

The fourth embodiments include variations in which the first pocket is of MERV 11 media and the second pocket is of MERV 14.

The fourth embodiments include variations in which the first pocket fits within the second and has a depth that is shorter than the second pocket such that there is a stream-wise separation distance between the downstream end of the first pocket and the second pocket that is at least 15% of the stream-wise depth of the first pocket such that upon inflation due to air flow, the first and second pockets are substantially separated.

According to fifth embodiments, the disclosed subject matter includes a filter for filtering a pollutant stream. A pocket filter includes a first pocket of a first media material has a thickness of less than 20 mm and of oil-compatible material. The pocket filter includes a second pocket of a second media material has a thickness of less than 20 mm and is of oil-compatible material. the second pocket second media material is of higher efficiency than the first. The first pocket fits within the second and has a depth that is shorter than (or the same length as) the second pocket such that there may be a stream-wise separation distance between the downstream end of the first pocket and the second pocket that is at least 15% of the stream-wise depth of the first pocket such that upon inflation due to air flow, the first and second pockets are substantially separated.

The fifth embodiments include variations that include an open separation material between the first and second pockets effective to define an air gap between all points of the first pocket and all points of the second pocket.

The fifth embodiments include variations in which the separation material includes a plastic foam lattice.

The fifth embodiments include variations in which the separation material includes a wire frame.

The fifth embodiments include variations in which the wire frame is attached to the first pocket.

The fifth embodiments include variations in which the first pocket is of MERV 9 media and the second pocket is of MERV 14.

According to sixth embodiments, the disclosed subject matter includes a method of cleaning fumes from a gas stream. The method includes flowing grease laden fumes through a first depth-loading filter and then through a second depth loading filter medium. The method includes maintaining a gap between the first and second depth-loading filters by means of a porous separation medium. The first depth-loading filter has a lower efficiency rating than the second depth-loading filter. The porous medium has a lower efficiency than the first, the porous separation medium, the first depth-loading filter and the second depth-loading filter all is of unwoven fiber.

The sixth embodiments include variations in which the first depth-loading filter is of a uniform unwoven fiber with no backing layer.

The sixth embodiments include variations in which the second depth-loading filter has a backing layer with a higher tensile strength than the remainder of the second depth-loading filter, the backing layer is on a downstream face thereof, the method further comprising supporting the first depth-loading filter, the porous medium, and the second depth-loading filter.

The sixth embodiments include variations in which the porous separation medium is of uniform unwoven fiber.

The sixth embodiments include variations in which the porous medium has a higher tensile strength than the first depth-loading filter.

In any of the embodiments described using the term "wicking efficiency," can be described instead as potentially different embodiments using the term "filtration efficiency" instead of wicking efficiency. Orin alternatives, the "capillary strength," "density," or "MERV rating" may be used to replace wicking efficiency.

It is, thus, apparent that there is provided, in accordance with the present disclosure, filter devices methods and systems. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A filter assembly for filtering a pollutant stream, comprising:
a plurality of pocket filters positioned adjacent to each other;
each of the pocket filters including a first pocket of a first media material having a thickness of less than 20 mm and being oil-compatible and a second pocket of a second media material having a thickness of less than 20 mm and being oil-compatible; and
an expansion barrier between adjacent pocket filters of the plurality of pocket filters, the expansion barrier including an open cell material to prevent walls of the adjacent pocket filters from directly contacting while permitting gas to flow therethrough, wherein
the second media material is of a higher efficiency than the efficiency of said first media material,
the first pocket fits within the second pocket and has a depth that is shorter than the depth of the second pocket,
a spacer is positioned between the first and second pockets and provides clearance between the first and the second pockets, and
the spacer has openings that are larger than openings of the first and second pocket media.

2. The filter assembly of claim 1, further comprising an open separation material between the first and second pockets defining an air gap or flow resistant medium between all points of the first pocket and all points of the second pocket.

3. The filter assembly of claim 2, wherein the flow resistant medium has a lower wicking strength than the media material of the first pocket.

4. The filter assembly of claim 2, wherein the open separation material includes a plastic foam lattice.

5. The filter assembly of claim 2, wherein the open separation material includes a wire frame.

6. The filter assembly of claim 5, wherein the wire frame is attached to the first pocket.

7. The filter assembly of claim 1, wherein the first pocket is of MERV 9 media and the second pocket is of MERV 14.

8. The filter assembly of claim 1, wherein
the spacer has openings of at least 2 mm in size with an open area fraction greater than 50% and a depth that defines a minimum spacing of at least 3 mm.

9. The filter assembly of claim 1, wherein
the first pocket of a respective pocket filter fits entirely within the second pocket of the respective pocket filter.

10. The filter assembly of claim 1, comprising first and second filtration layers and a separation layer, wherein the first and second filtration layers and the separation layer form a single multilayered textile.

11. The filter assembly of claim 2, comprising first and second filtration layers and a separation layer, wherein the first and second filtration layers and the separation layer form a single multilayered textile sheet formed into pockets.

12. The filter assembly of claim 2, comprising first and second filtration layers and a separation layer, wherein the first and second filtration layers and the separation layer form the first pockets and the second pockets with the separation layer therebetween.

13. The filter assembly of claim 2, further comprising a frame with respective portions extending into an interior of each of the first pockets.

14. The filter assembly of claim 2, comprising first and second filtration layers and a separation layer, wherein the first and second filtration layers and the separation layer form the first pockets and the second pockets with the separation layer therebetween and the first filtration layer is of uniform structure while the second filtration layer has a backing of higher tensile strength than a remainder of the second filtration layer, whereby the second filtration layer supports the first filtration layer and the separation layer.

15. The filter assembly of claim 2, comprising first and second filtration layers and a separation layer, wherein the first and second filtration layers and the separation layer form the first pockets and the second pockets with the separation layer therebetween and the first filtration layer and second filtration layer are of uniform structure without a backing of higher tensile strength than a remainder of the first or second filtration layer, the separation layer having a higher tensile strength than the first or second filtration layers, and the first and second filtration layers are bonded to the separation layer, whereby the separation layer supports the first and second filtration layers.

16. The filter assembly of claim 2, comprising first and second filtration layers and a separation layer, wherein the first and second filtration layers and the separation layer form the first pockets and the second pockets with the separation layer therebetween and the first filtration layer and second filtration layer are of uniform structure without a backing of higher tensile strength than a remainder of the first or second filtration layer, further comprising an external frame surrounding each pocket and preventing the walls of adjacent pockets from contacting each other due to inflation.

* * * * *